(12) United States Patent
Lee et al.

(10) Patent No.: US 12,605,232 B2
(45) Date of Patent: Apr. 21, 2026

(54) METHOD FOR PROVIDING DENTAL ABUTMENT

(71) Applicant: OSSTEMIMPLANT CO., LTD., Seoul (KR)

(72) Inventors: Young Seok Lee, Seoul (KR); Jae Chan Heo, Seoul (KR); Keun Sik Chang, Seoul (KR); Tae Gwan Eom, Seoul (KR); Kyoo Ok Choi, Seoul (KR)

(73) Assignee: OSSTEMIMPLANT CO., LTD., Seoul (KR)

( * ) Notice: Subject to any disclaimer, the term of this patent is extended or adjusted under 35 U.S.C. 154(b) by 708 days.

(21) Appl. No.: 17/641,856

(22) PCT Filed: Jun. 5, 2020

(86) PCT No.: PCT/KR2020/007353
§ 371 (c)(1),
(2) Date: Mar. 10, 2022

(87) PCT Pub. No.: WO2020/246851
PCT Pub. Date: Dec. 10, 2020

(65) Prior Publication Data
US 2022/0346919 A1 Nov. 3, 2022

(30) Foreign Application Priority Data
Jun. 5, 2019 (KR) ........................ 10-2019-0066563

(51) Int. Cl.
*A61C 8/00* (2006.01)

(52) U.S. Cl.
CPC .................................. *A61C 8/005* (2013.01)

(58) Field of Classification Search
CPC ... A61C 8/005; A61C 9/0053; A61C 13/0004; A61C 9/0046; A61B 2034/102; A61B 2034/108; A61B 34/10
See application file for complete search history.

(56) References Cited

U.S. PATENT DOCUMENTS 5,533,895 A * 7/1996 Andreiko ............... A61C 7/146
433/8
6,950,880 B1 * 9/2005 Durrant .................. G06Q 30/06
709/219

(Continued)

FOREIGN PATENT DOCUMENTS

CN 105787177 A 7/2016
JP 09-010234 A 1/1997

(Continued)

OTHER PUBLICATIONS

Extended European Search Report dated Jul. 14, 2023 in European Application No. 20817978.8.

(Continued)

*Primary Examiner* — Thomas C Lee
*Assistant Examiner* — Tyler Dean Hedrick
(74) *Attorney, Agent, or Firm* — Sughrue Mion, PLLC

(57) ABSTRACT

Disclosed is a method for providing a dental abutment by using data about a customized abutment, comprising the steps of: receiving oral data about a patient; and acquiring a standardized abutment from a standardized abutment group generated from the customized abutment in correspondence with the inputted oral data about the patient.

2 Claims, 4 Drawing Sheets

(56) References Cited

U.S. PATENT DOCUMENTS

| | | | | |
|---|---|---|---|---|
| 9,275,033 B2 * | 3/2016 | Wong | .................... | G06F 40/186 |
| 2001/0016803 A1 * | 8/2001 | Sartiono | ................. | G06T 19/00 |
| | | | | 700/182 |
| 2012/0100500 A1 * | 4/2012 | Gao | ........................ | B33Y 80/00 |
| | | | | 703/11 |
| 2012/0237902 A1 | 9/2012 | Maniscalco | | |
| 2014/0234801 A1 | 8/2014 | Herrington et al. | | |
| 2015/0317701 A1 * | 11/2015 | Thomas | .............. | G06F 16/2365 |
| | | | | 705/306 |
| 2020/0383759 A1 * | 12/2020 | Je | ............................ | G06T 19/20 |
| 2021/0406417 A1 * | 12/2021 | Hamada | ............ | G06F 16/90335 |

FOREIGN PATENT DOCUMENTS

| | | | |
|---|---|---|---|
| KR | 20-0395580 Y1 | 9/2005 | |
| KR | 10-1091587 B1 | 12/2011 | |
| KR | 101632377 B1 * | 6/2016 | |
| KR | 10-1872393 B1 | 6/2018 | |
| WO | 2014/141369 A1 | 9/2014 | |

OTHER PUBLICATIONS

International Search Report for PCT/KR2020/007353 dated Dec. 21, 2020 (PCT/ISA/210).

Written Opinion for PCT/KR2020/007353 dated Dec. 21, 2020 (PCT/ISA/237).

* cited by examiner

[Fig. 1]
Prior Art
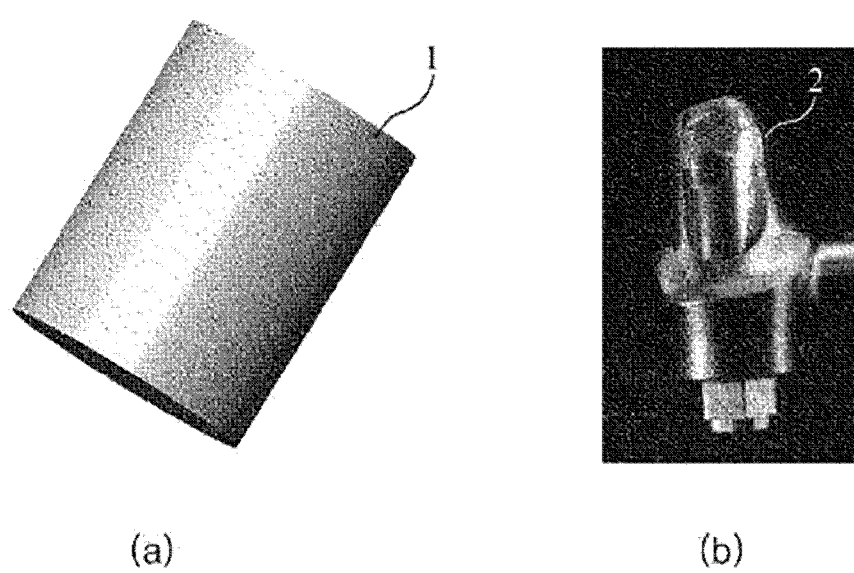
(a)                                    (b)

[Fig. 2]
Prior Art
10
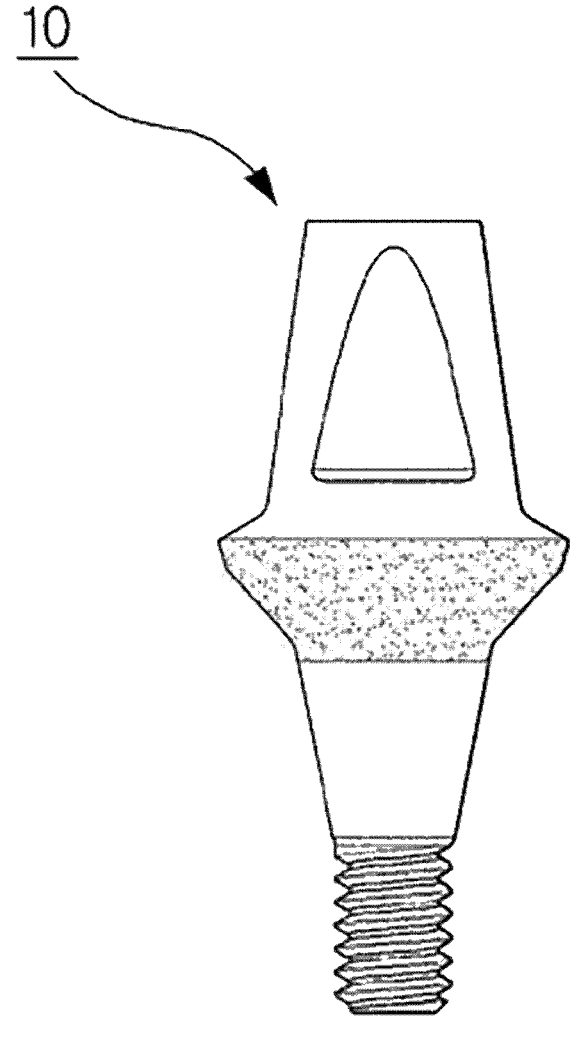

[Fig. 3]
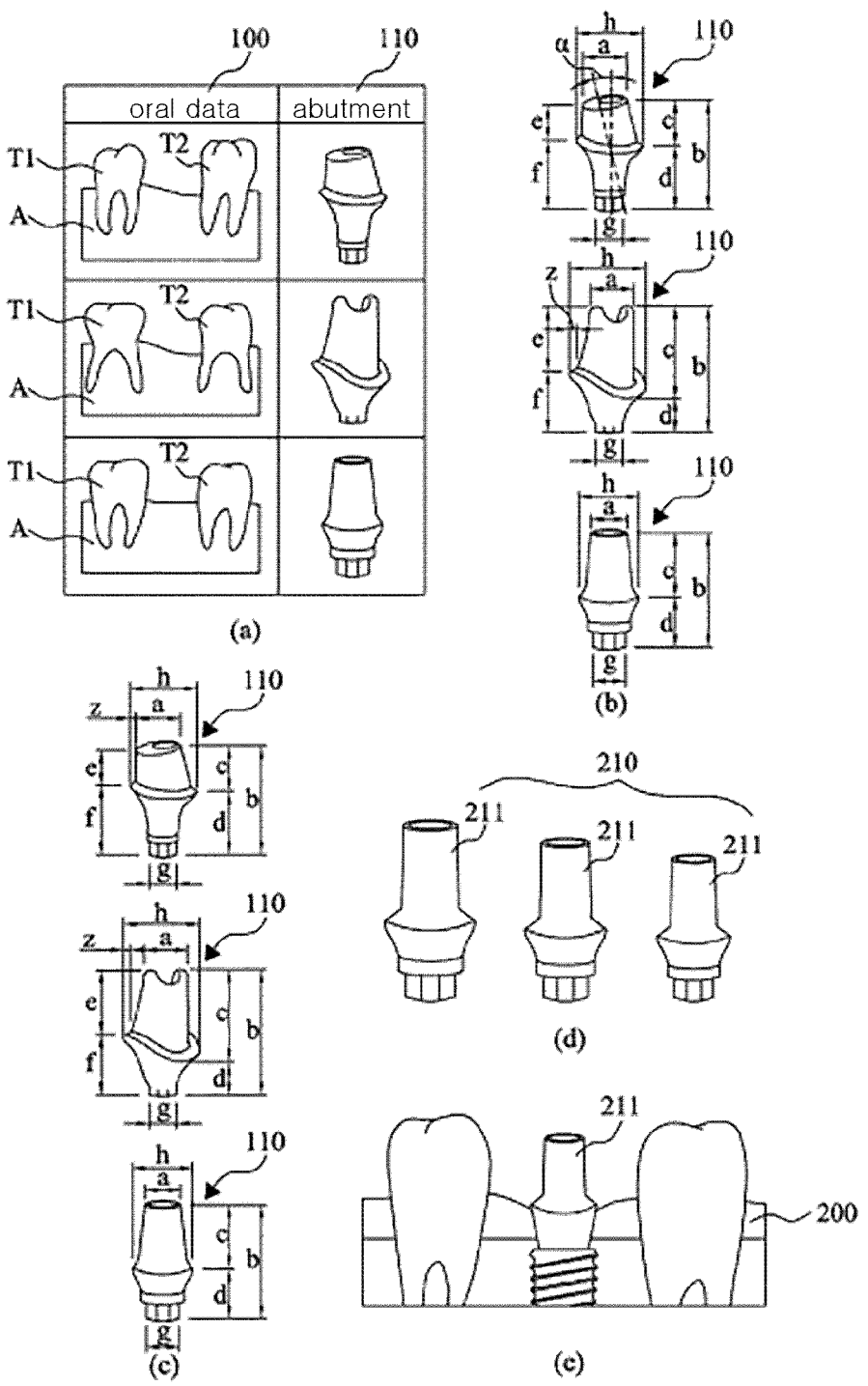
(a)
(b)
(c)
(d)
(c)

[Fig. 4]
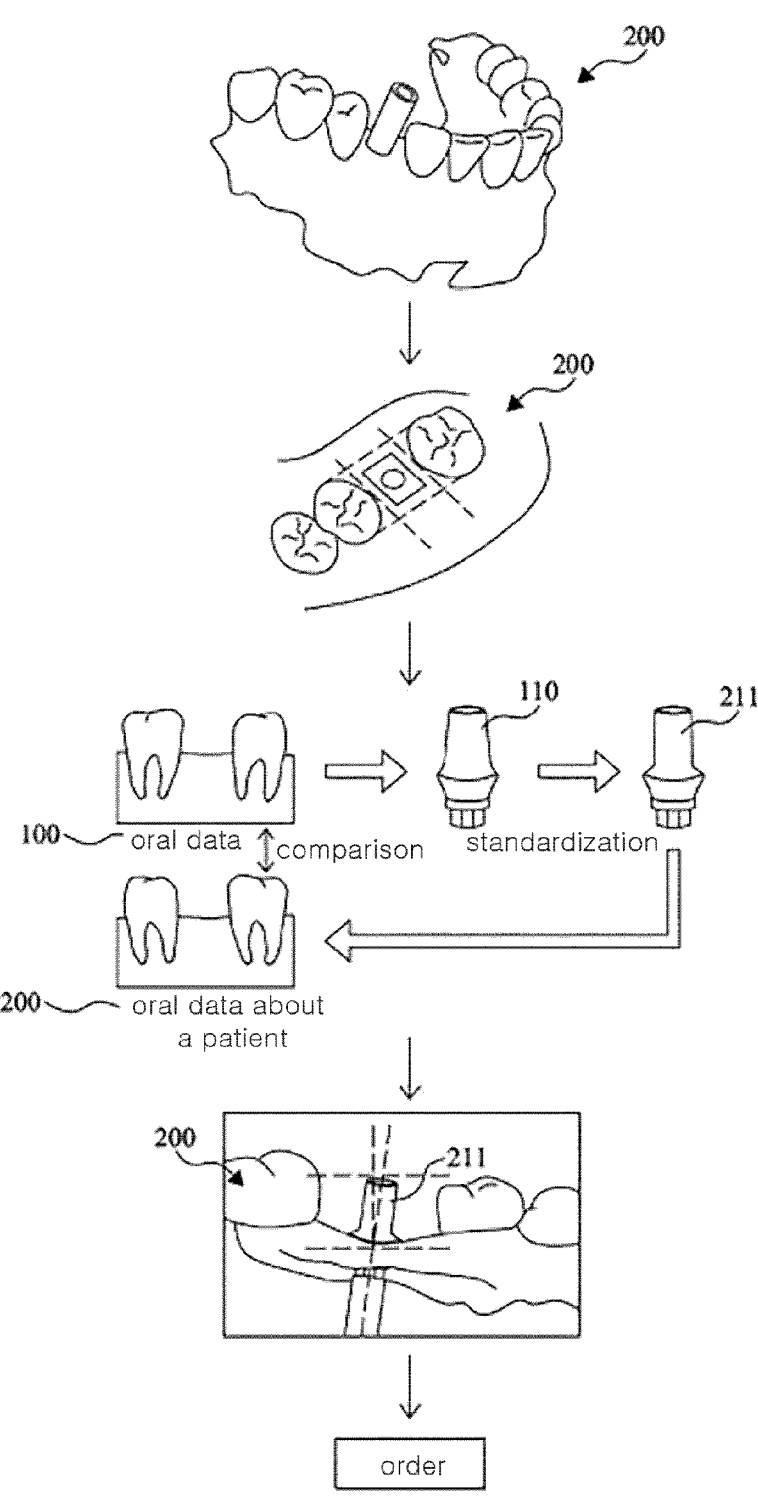

METHOD FOR PROVIDING DENTAL ABUTMENT

CROSS REFERENCE TO RELATED APPLICATIONS

This application is a National Stage of International Application No. PCT/KR2020/007353 filed Jun. 5, 2020, claiming priority based on Korean Patent Application No. 10-2019-0066563 filed Jun. 5, 2019, the entire disclosures of which are incorporated herein by reference.

TECHNICAL FIELD

The present disclosure generally relates to a method for providing dental abutment. More specifically, the present disclosure relates to a method for providing a standardized dental abutment by using oral data about a patient.

BACKGROUND ART

This section provides background information related to the present disclosure which is not necessarily prior art.

FIG. 1 is a view illustrating an example of a dental implant abutment disclosed in Korean Patent No. 10-1091587. For the sake of convenience of explanation, terms are changed.

An implant is a replacement used to recover missing human tissues. In dentistry, generally, an implant is a replacement that recovers the original function of the tooth by implanting a fixture into the alveolar bone where the natural tooth root is missing to adhere thereto to replace the root of the missing tooth, and fixing an artificial tooth thereto.

Such dental implants may be classified diversely depending on how the artificial tooth and the tooth root join each other. Among implants, there is a screw type implant which uses the joining force of a screw. The conventional screw type implant system (implant assembly) includes a fixture, an abutment and an artificial tooth, etc.

During an implant surgery, an operator performs the surgery by selecting a proper fixture or abutment, etc. from products having various diameters and screw pitches in consideration of patient's oral conditions, etc.

Particularly, in the implant system, in the case of an abutment which is placed between a fixture implanted into the alveolar bone and an artificial tooth, abutments having various shapes are to be used depending on the states of the fixture implanted into the jawbone or patient's oral conditions, etc.

Recently, a method for producing a customized abutment that is suitable for each patient using CAD-CAM technology, without using a ready-made abutment, is suggested. In order to produce such a customized abutment, a customized abutment 2 that fits into the surgical environment as shown in (b) of FIG. 1 is to be produced by processing an abutment block 1 having a cylindrical shape or a cylindrical bar as shown in (a) of FIG. 1 using CAD-CAM technology.

Meanwhile, in practically processing the customized abutment 2 of which the design has been completed in this manner, each abutment is to be individually processed, which lowers productivity and accordingly, increases processing costs and patient's burdens or dental charges. Such problems may be an obstacle to widely using the customized abutment 2 that has been designed to be optimized for the patient in practice.

FIG. 2 is a view illustrating an example of an implant abutment disclosed in Korean Utility Model No. 20-0395580.

As for an implant abutment, an artificial tooth root, a fixture made of titanium, etc. which is not rejected by the human body, is implanted into the bone where the tooth is missing, to replace the root of the missing tooth, and then an artificial tooth, called an artificial crown, is fixed to the artificial tooth root using an abutment 10, thereby recovering the function of the tooth.

The customized abutment 2 requires much time and high costs because it is customized for each individual, as explained in FIG. 1. However, the customized abutment 2 is produced to well fit on the artificial tooth and gum, which prevents food impaction and is aesthetically pleasing. By comparison, the abutment 10 as explained in FIG. 2, a ready-made abutment, is delivered after being manufactured by a manufacturer in advance on a mass scale, and thus have advantages of being provided in a short time at lower prices. However, the abutment in FIG. 2 has problems that there are cases where the abutment does not fit on the artificial tooth and gum, which causes food impaction or tooth displacement.

The present disclosure is to provide an abutment having the advantages of both of the customized abutment 2 in FIG. 1 and the ready-made abutment in FIG. 2.

DETAILED DESCRIPTION OF INVENTION

Technical Task

The technical task will be described at the end of the "detailed embodiments for carrying out the invention" section below.

Means for Solving Technical Task

This section provides a general summary of the disclosure and is not a comprehensive disclosure of its full scope or all of its features.

According to one aspect of the present disclosure, a method for providing a dental abutment, comprising: preparing a plurality of oral data, and a plurality of customized abutment data in correspondence with each of the plurality of oral data; and standardizing the plurality of customized abutment data to generate a standardized abutment group, wherein each of the plurality of oral data is associated with one standardized abutment of the standardized abutment group, and when oral data about a patient is inputted, the oral data is compared with the plurality of oral data so that the one standardized abutment is provided as the dental abutment, is provided.

According to another aspect of the present disclosure, a method for providing a dental abutment by using data about a customized abutment, comprising: receiving oral data about a patient; and acquiring a standardized abutment from a standardized abutment group generated from the customized abutment in correspondence with the inputted oral data about the patient, is provided.

Effect of Invention

The effect of the invention will be described at the end of the "detailed embodiments for carrying out the invention" section below.

BRIEF DESCRIPTION OF DRAWINGS

FIG. 1 is a view illustrating an example of a dental implant abutment disclosed in Korean Patent No. 10-1091587;

FIG. 2 is a view illustrating an example of an implant abutment disclosed in Korean Utility Model No. 20-0395580;

FIG. 3 is a view illustrating an example of a method for providing a dental abutment according to the present disclosure; and FIG. 4 is a view explaining a step of designating a standardized abutment by using oral data about a patient according to the present disclosure.

DETAILED MEANS FOR CARRYING OUT THE INVENTION

Hereinafter, the present disclosure will now be described in detail with reference to the accompanying drawing(s).

FIG. 3 is a view illustrating an example of a method for providing a dental abutment according to the present disclosure.

First, as illustrated in (a) of FIG. 3, customized abutment data 110 according to oral data 100 are collected (S1).

The oral data 100 may be measured by conventional impression taking methods or scans, X-Rays, CTs, etc. The oral data 100 may include position of a tooth, height of gum, shape of gum, angle between a tooth and bone, size of a tooth, diameter of a tooth, etc. The oral data 100 and customized abutment data 110 are connected to each other.

Afterwards, as illustrated in (b) of FIG. 3, a parameter is designated according to the customized abutment data 110 measured and analyzed (S2).

The parameter (e.g., a, b, d, f) may be designated by analyzing the customized abutment data 110 matched according to the oral data 100. Alternatively, a factor considered to be important by a user may be designated as a parameter.

The parameter may include height (b) of the abutment, height (c, e) of an upper portion on the basis of gum, height (d, f) of a lower portion on the basis of gum, width (a) of a distal end of an upper portion, widest width (h), margin (z), angle (α), position, depth, shape, width (g) of a distal end of a lower portion, etc. Among the above, a parameter which is considered to be important may be designated.

Afterwards, as illustrated in (c) of FIG. 3, the customized abutment data 110 according to the collected oral data 100 are measured and analyzed (S3).

The customized abutment data 110 according to the collected oral data 100 may include height (b) of the customized abutment, height (c, e) of an upper portion on the basis of gum, height (d, f) of a lower portion on the basis of gum, width (a) of a distal end of an upper portion, widest width (h), margin (z), angle (α), position, depth, shape, width (g) of a distal end of a lower portion, etc.

Afterwards, as illustrated in (d) of FIG. 3, the abutment is standardized according to the parameter (S4).

The customized abutment data 110 are analyzed to calculate a value of a designated parameter, thereby standardizing a value of the parameter. For example, a standardized abutment group 210 may be formed with an average value of the parameter of the customized abutment.

The standardized abutment group 210 is formed according to the value of the parameter in accordance with the customized abutment data 110. A plurality of standardized abutments 211 of the standardized abutment group 210 are associated with each of the oral data 100.

Afterwards, as illustrated in (e) of FIG. 3, the standardized abutment 211 is designated through oral data 200 about a patient (S5). The oral data 200 about the patient are provided, and the standardized abutment 211 is designated based on the measured value using the oral data 200 about the patient. For example, the oral data 200 about the patient may include 3D surface scan data, and the standardized abutment 211 is designated by using the 3D surface scan data. When the standardized abutment 211 is designated according to the oral data 200 about the patient, said abutment may be virtually implanted to oral cavity. After the virtual implant, it is confirmed whether the standardized abutment 211 fits well to the patient.

Since part of the standardized abutment 211 may not fit during use, a step verifying the same may be further included. The oral data 200 about the patient is displayed on a monitor. The standardized abutment 211 that fits the oral data 200 about the patient may be put on the oral data 200 of the patient to check at least one of size, angle, and shape of gum.

When it is confirmed that the abutment fits well to the patient, the standardized abutment 211 is ordered, and the standardized abutment 211 is delivered according to the order. The standardized abutment 211 may be manufactured in advance. Additionally, the standardized abutment 211 delivered is used for patients.

FIG. 4 is a view explaining the step of designating a standardized abutment through oral data about a patient according to the present disclosure.

First, the oral data 200 about the patient is collected. The oral data 200 about the patient may be collected through 3D surface scans, CT scans and impressions.

Afterwards, the oral data 200 about the patient is analyzed. The oral data 200 about the patient may include position of a tooth, height of gum, shape of gum, angle between a tooth and bone, size of a tooth, diameter of a tooth, etc.

Then, the oral data 200 about the patient is matched with the standardized abutment 211. In oral data 100 (see (a) of FIG. 3), oral data 100 which is the most similar to the oral data 200 about the patient is found. The oral data 100 similar to the oral data 200 about the patient is matched with the standardized abutment 211 which standardizes the abutment data. Therefore, the oral data 200 about the patient may be matched with the standardized abutment 211.

Afterwards, the 3D surface scan data and a modeling of the designated standardized abutment 211 are virtually installed on a program and it is confirmed whether they fit to each other.

Then, the standardized abutment 211 is ordered.

Hereinafter, various embodiments of the present disclosure are explained.

(1) A method for providing a dental abutment, comprising: preparing a plurality of oral data, and a plurality of customized abutment data in correspondence with each of the plurality of oral data; and standardizing the plurality of customized abutment data to generate a standardized abutment group, wherein each of the plurality of oral data is associated with one standardized abutment of the standardized abutment group, and when oral data about a patient is inputted, the oral data is compared with the plurality of oral data so that the one standardized abutment is provided as the dental abutment.

(2) The method for providing a dental abutment, wherein the step of generating a standardized abutment group comprises designating a parameter from a plurality of customized abutments, and the parameter includes at least one of height of each customized abutment, height of an upper portion on the basis of gum, height of a lower portion on the basis of gum, width of a distal end of an upper portion, widest width, angle, margin, position, depth, and shape.

(3) A method for providing a dental abutment by using data about a customized abutment, comprising: receiving oral data about a patient; and acquiring a standardized abutment from a standardized abutment group generated from the customized abutment in correspondence with the inputted oral data about the patient. Here, the step of acquiring a standardized abutment may be performed by comparing inputted oral data about a patient with a plurality of oral data already obtained, or extracting a parameter from the inputted oral data about the patient to designate the closest standardized abutment among the standardized abutment group.

(4) The method for providing a dental abutment, wherein the step of acquiring a standardized abutment comprises comparing oral data about the patient inputted from the customized abutment with the oral data associated with the customized abutment.

(5) The method for providing a dental abutment, wherein the step of generating a standardized abutment group comprises designating a parameter from the customized abutment, and the parameter includes at least one of height of each customized abutment, height of an upper portion on the basis of gum, height of a lower portion on the basis of gum, width of a distal end of an upper portion, widest width, angle, margin, position, depth, and shape.

(6) The method for providing a dental abutment, further comprising verifying the acquired standardized abutment with oral data about the patient.

According to the method for providing dental abutment of the present disclosure, aesthetically excellent dental abutments may be provided to customers rapidly and inexpensively.

What is claimed is:

1. A method for providing a dental abutment, comprising:

preparing a plurality of oral data, and a plurality of customized abutment data in correspondence with each of the plurality of oral data; and standardizing the plurality of customized abutment data to generate a standardized abutment group, wherein each of the plurality of oral data is associated with one standardized abutment of the standardized abutment group, and when oral data about a patient is inputted, the oral data is compared with the plurality of oral data so that the one standardized abutment is provided as the dental abutment, wherein the generating of the standardized abutment group comprises designating a parameter from a plurality of customized abutments and forming the standardized abutment group based on a standardized value of the parameter and based on the plurality of customized abutment data, and wherein the method further comprises verifying a fit of the dental abutment by virtually implanting the dental abutment to an oral cavity and displaying the oral data about the patient and one or more parameters of the dental abutment, the displayed oral data about the patient comprising at least one of a size, an angle, or a shape of a gum.

2. The method of claim 1, wherein the parameter includes at least one of height of each customized abutment, height of an upper portion of each customized abutment based on the gum, height of a lower portion of each customized abutment based on the gum, width of a distal end of the upper portion, widest width, angle, margin, position, depth, and shape.

* * * * *